Patented Apr. 8, 1930

1,754,052

UNITED STATES PATENT OFFICE

LEO ROSENTHAL, OF VOHWINKEL, AND WALTER KROPP, OF ELBERFELD, GERMANY, ASSIGNORS TO I. G. FARBENINDUSTRIE AKTIENGESELLSCHAFT, OF FRANKFORT-ON-THE-MAIN, GERMANY

COMPOUND FROM INDENE AND PHENOLS

No Drawing. Application filed June 22, 1927, Serial No. 200,761, and in Germany June 28, 1926.

The present invention relates to new compounds of the indene series and to a process of preparing same.

We have found that new valuable compounds are obtained by causing a halogen acid to act upon a mixture of an indene compound and a phenol compound. One may use, for instance, as reaction components indene, such derivatives of indene as are substituted in α-position or any other indene derivative and on the other hand phenol, cresol, amino-, nitro-, or chloro-phenols, thymol, naphthols, polyvalent phenols such as pyrocatechin, resorcin and the like. It is not necessary to use the reaction components in a pure state, but one may use crude substances containing either an indene compound or a phenol compound, respectively. For instance, instead of indene one may use the crude benzene fraction distilling at a temperature of about 160–190° C. at room temperature. The reaction proceeds in the presence of small quantities of halogen acids or metal chlorides, in most cases also at ordinary temperature and frequently with the evolution of heat. The halogen acid can be employed in the gaseous form or in aqueous or alcoholic solutions and the metal chlorides as anhydrous salts or in the form of aqueous or alcoholic solutions. Instead of a halogen acid one may use ferric chlorides which act in an equivalent manner.

The new products obtained in accordance with the present invention are intended to find application for therapeutical purposes, as disinfectants, as bases for the manufacture of lacquers, as intermediate products for the manufacture of dyestuffs and the like.

They are viscous oils which can be distilled in vacuo. They are soluble in alcohol, benzene, ethyl acetate, butyl acetate or the like. They represent mostly a mixture of several compounds. By extracting them with diluted alkali lye substances may be obtained which correspond probably to the general formula:

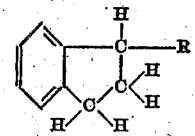

wherein R represents an aromatic nucleus substituted by at least one hydroxyl group. The alkali-insoluble part represents condensation products probably containing ether-bondages the structure of which, however, is not definitely known.

The following examples will illustrate our invention, which is applicable within very wide limits:—

*Example 1.*—To a mixture of 6 parts by weight of indene and 5 parts by weight of phenol, 2 parts by weight of concentrated hydrochloric acid are added with stirring. A highly viscous oil separates with strong evolution of heat, the hydrochloric acid and small quantities of unchanged starting material being removed in the known manner. In order to effect purification the reaction product can be distilled in vacuo. A light colored oil, soluble in very many organic solvents is obtained, distilling at above 180° C. under 9 mm. pressure. Instead of concentrated hydrochloric acid an alcoholic hydrochloric acid solution can be employed, in which case stirring of the reaction mixture is not necessary.

Instead of the above mentioned quantity of indene the corresponding quantity of crude solvent naphtha can be employed, containing the same amount of indene and from which bases and phenols have preferably been removed.

The oil, which boils above 180° C. and under 9 mm., can be dissolved in 5 to 6 times the quantity of cyclohexane, hexahydrotoluene or other suitable hydroaromatic hydrocarbon, from which solution a substance soon crystallizes in a pure state possessing a melting point of 88° C. From its chemical behavior and analysis the new product is probably hydrindylphenol (oxyphenylindane) of the following constitution:—

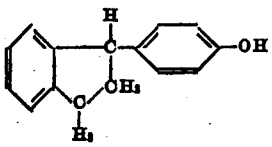

There remains in the mother liquor a reaction product, insoluble in alkali, which on the elimination of the solvent constitutes a highly viscous light colored oil.

Hydrindylphenol is soluble in very dilute alkali lye. When 200 grams of this phenol are dissolved in one litre of normal caustic soda lye, the sodium salt of the hydrindylphenol crystallizes very soon. The new phenol gives with organic bases well defined compounds, as for example with hexamethylene-tetramine a substance melting at 112° C. and very difficultly soluble in water. On account of its non-poisonous nature and good disinfecting action hydrindylphenol is well suited to application for therapeutic purposes.

*Example 2.*—A mixture of 300 parts by weight of crude benzene, boiling between 160–190° C. are stirred for several hours with 100–150 parts by weight of crude cresol with the addition of 20 parts by weight of 20% hydrochloric acid, whereupon the mixture is washed until free from acid and then subjected to vacuum distillation. A light colored highly viscous oil, boiling at 180 to 230° C. under 9 mm., is obtained together with a small quantity of a light colored resin, which is completely soluble in alcohol and can be employed for the manufacture of spirit lacquers and the like. The viscous oil can be resolved into an alkali soluble and an alkali insoluble portion.

*Example 3.*—60 parts by weight of indene are mixed with 70 parts by weight of α-naphthol and 3 to 5 parts by weight of a 20% alcoholic hydrochloric acid solution are introduced. When the reaction is complete the unchanged naphthol is removed with dilute caustic soda lye. About 110 parts by weight are obtained of an alcohol soluble, alkali insoluble oil, which is highly viscous at ordinary temperature.

*Example 4.*—500 parts by weight of crude benzene (distillation limits 160–185° C.) are mixed with 100 parts by weight of crude cresol. Into the mixture 40 parts by weight of crystalline ferric chloride or a solution of 20 parts by weight of anhydrous ferric chloride in 20 parts by weight of alcohol are added and the whole is stirred for several hours. The ferric chloride is removed in known manner and after distillation in vacuo of the volatile portion (up to 180° C.), a light colored resin is obtained, which melts at about 95–110° C. and is soluble in warm alcohol. On the addition of small quantities of butyl alcohol or oil of turpentine to the alcoholic resin solution no separation of the resin occurs even at ordinary temperature.

*Example 5.*—A mixture of 221 parts by weight of α-xylylindene, 108 parts by weight of cresol or phenol and 20 parts by weight of concentrated hydrochloric acid are stirred for several hours. After the working up of the reaction product as described in Example 2 a highly viscous oil is obtained, which is insoluble in alkali and boils at 200 to 250° C. under 10 mm. pressure.

*Example 6.*—100 parts by weight of an indene fraction having a content of 49% indene are mixed with 46 parts by weight of o-cresol. To this solution 5 parts by weight of concentrated hydrochloric acid are added. The temperature thereby rises from 22° to about 40° C. As a result of this reaction there is produced together with a highly viscous alkali insoluble oil an alkali soluble substance, which crystallizes well and possesses phenolic character, which on analysis appears to be hydrindyl-o-cresol of the probable formula:—

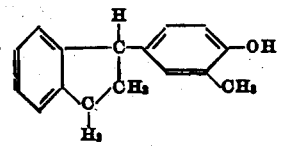

This substance is obtained by extracting the reaction liquid advantageously after dilution with benzene with dilute caustic soda lye, acidifying the alkaline solution, separating the resulting oil and distilling the mixture of unchanged o-cresol and hydrindyl-o-cresol in vacuo. From the fraction which passes over between 200–230° C. under 10 mm. the hydrindyl-o-cresol is obtained by recrystallization from cyclohexane in well developed crystals of melting point 63° C.

When the reaction solution extracted with caustic soda lye is distilled in vacuo under 10 mm. pressure, a highly viscous oil passes over above 180° C., which is soluble in alcohol and benzene in all proportions and finds application for technical purposes.

*Example 7.*—A mixture of 250 parts by weight of an indene fraction with a content of 50% of indene and 130 parts by weight of resorcinol is heated to 35–40° C. with brisk stirring. 10 to 20 parts by weight of alcoholic hydrochloric acid solution of 20% HCl content are then added, with continued stirring. The temperature of the reaction mass rises very quickly to 80 to 90° C., stirring is continued for some time until the temperature is reduced to 70–80° C. and then the whole is diluted with 300 to 400 parts by weight of benzene.

This solution is then extracted with dilute alkali lye. From the alkaline solution a viscous oil is precipitated on acidification which is purified from small quantities of unchanged resorcin by repeated stirring with water. The oil, free from resorcin, is thereupon subjected to vacuum distillation. A viscous oil is thus obtained in very good yield. It distils at 220–260° C. under 2 mm. and solidifies on cooling to a light transparent mass. This mass appears to be a mixture of several substances possessing phenol character and can be employed for the manufacture of lacquers and the like and other purposes.

The term "indenic compound" is used in the following claims to denote indene and its homologues and substitution products either singly or in admixture, and the term "phenolic compound" is used to denote aromatic compounds containing one or more hydroxyl groups attached to the organic nucleus, and their homologues and substitution products either singly or in admixture.

We claim:—

1. The process which comprises causing a halogen acid to act upon a mixture of an indenic compound and a phenolic compound.

2. The process which comprises causing hydrochloric acid to act upon a mixture of an indenic compound and a phenolic compound.

3. The process which comprises causing hydrochloric acid to act upon a mixture of indene and phenol.

4. As new products the compounds of the general formula:

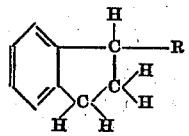

wherein R represents an aromatic nucleus substituted by at least one hydroxyl group.

5. As a new product the compound of the general formula:

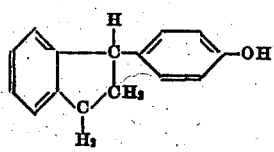

melting at 88° C. and forming with hexamethylenetetramine a substance melting at 112° C.

6. As new products, reaction products of phenolic compounds with indenic compounds which are obtainable by causing a halogen acid to act upon a mixture of an indenic compound and a phenolic compound, said products being viscous oils, distilling at a high temperature in vacuo, and being generally soluble in organic solvents.

In testimony whereof we have hereunto set our hands.

LEO ROSENTHAL.
WALTER KROPP.